(12) United States Patent
Lee

(10) Patent No.: US 6,681,913 B2
(45) Date of Patent: Jan. 27, 2004

(54) COUPLING DEVICE

(75) Inventor: Hyeongcheol Lee, Ann Arbor, MI (US)

(73) Assignee: Visteon Global Technologies, Inc., Deaborn, MI (US)

( * ) Notice: Subject to any disclaimer, the term of this patent is extended or adjusted under 35 U.S.C. 154(b) by 0 days.

(21) Appl. No.: 09/908,367

(22) Filed: Jul. 18, 2001

(65) Prior Publication Data

US 2003/0015384 A1 Jan. 23, 2003

(51) Int. Cl.[7] .............................................. F16H 25/04
(52) U.S. Cl. ....................... 192/103 F; 192/49; 74/650
(58) Field of Search ............................ 192/35, 103 F, 192/49, 87.12; 74/650; 475/88

(56) References Cited

U.S. PATENT DOCUMENTS

| | | |
|---|---|---|
| 473,444 A | 4/1892 | Barney |
| 1,677,996 A | 7/1928 | Wingquist |
| 2,175,520 A | 10/1939 | Frederickson |
| 2,623,619 A | 12/1952 | Clerk |
| 2,986,024 A | 5/1961 | Power |
| 3,118,292 A | 1/1964 | Schroter et al. |
| 3,350,961 A * | 11/1967 | Dodge ........................... 74/711 |
| 3,724,289 A * | 4/1973 | Kennicutt .................... 475/233 |
| 3,831,461 A | 8/1974 | Mueller |
| 4,012,968 A * | 3/1977 | Kelbel .................... 192/85 AA |
| 4,462,272 A | 7/1984 | Roper |
| 4,493,227 A | 1/1985 | Schmid |
| 4,630,505 A | 12/1986 | Williamson |
| 4,633,735 A | 1/1987 | Sakurai et al. |
| 4,676,336 A | 6/1987 | Hiramatsu et al. |
| 4,719,817 A | 1/1988 | Azuma |
| 4,719,998 A | 1/1988 | Hiramatsu et al. |
| 4,730,514 A | 3/1988 | Shikata et al. |
| 4,779,698 A | 10/1988 | Iwata |
| 4,838,118 A | 6/1989 | Binkley |
| 4,841,809 A | 6/1989 | Jolly |
| 4,867,012 A | 9/1989 | McGarraugh |
| 4,884,653 A | 12/1989 | Kouno |
| 4,905,808 A * | 3/1990 | Tomita et al. ............... 180/233 |
| 4,949,594 A | 8/1990 | Galhotra |
| 4,960,011 A * | 10/1990 | Asano .......................... 74/650 |

(List continued on next page.)

FOREIGN PATENT DOCUMENTS

| | | |
|---|---|---|
| EP | 0825362 | 2/1998 |
| EP | 0886083 | 12/1998 |
| EP | 0911204 | 4/1999 |
| GB | 2 187 824 | 3/1986 |
| GB | 2252801 | 2/1992 |
| JP | 401182127 A | 7/1989 |
| JP | 1261553 | 10/1989 |
| JP | 200062495 | 2/2000 |
| JP | 200074096 | 3/2000 |
| JP | 2001-163079 | 6/2001 |

OTHER PUBLICATIONS

M. Okcuoglu, "A Descriptive Analysis of Gerodisc Type Limited Slip Differentials and All Wheel Drive Couplings", Society of Automotive Engineers, Inc., Copyright 1995, pp. 15–20.

(List continued on next page.)

Primary Examiner—Rodney H. Bonck
Assistant Examiner—Eric M. Williams
(74) Attorney, Agent, or Firm—Brinks Hofer Gilson & Lione

(57) ABSTRACT

A device for coupling an input shaft and an output shaft is provided. The device preferably includes a carrier coupled to the input shaft, a hydraulic pump coupled to the carrier and the output shaft, a hydraulic conduit coupled to the hydraulic pump, a piston coupled to the hydraulic conduit, a clutch coupled to the piston, and a control valve coupled to the hydraulic conduit.

26 Claims, 4 Drawing Sheets

U.S. PATENT DOCUMENTS

| | | | |
|---|---|---|---|
| 4,966,268 A | * 10/1990 | Asano et al. | 180/248 |
| 4,974,471 A | 12/1990 | McGarraugh | |
| 4,987,967 A | 1/1991 | Kouno | |
| 4,995,491 A | 2/1991 | Hiramatsu et al. | |
| 5,007,886 A | 4/1991 | Holmquist et al. | |
| RE33,742 E | 11/1991 | Blessing, et al. | |
| 5,092,825 A | 3/1992 | Goscenski, Jr. et al. | |
| 5,172,787 A | 12/1992 | Kobayashi | |
| RE34,209 E | 3/1993 | McGarraugh | |
| 5,189,930 A | 3/1993 | Kameda | |
| 5,194,053 A | 3/1993 | Sano et al. | |
| 5,201,820 A | 4/1993 | Hamada et al. | |
| 5,415,598 A | 5/1995 | Sawase et al. | |
| 5,445,574 A | 8/1995 | Sekiguchi et al. | |
| 5,456,641 A | 10/1995 | Sawase | |
| 5,469,950 A | 11/1995 | Lundström et al. | |
| 5,536,215 A | * 7/1996 | Shaffer et al. | 475/88 |
| 5,542,316 A | 8/1996 | Spooner et al. | |
| 5,690,002 A | 11/1997 | Showalter | |
| 5,735,764 A | * 4/1998 | Shaffer et al. | 192/103 F |
| 5,827,145 A | * 10/1998 | Okcuoglu | 192/102 F |
| 5,888,163 A | 3/1999 | Shaffer et al. | |
| 5,893,812 A | 4/1999 | Narai et al. | |
| 5,915,513 A | 6/1999 | Isley, Jr. et al. | |
| 5,916,052 A | 6/1999 | Dick | |
| 5,938,555 A | * 8/1999 | Leeper | 475/88 |
| 5,938,556 A | 8/1999 | Lowell | |
| 5,941,788 A | 8/1999 | Shaffer et al. | |
| 5,964,126 A | 10/1999 | Okcuoglu | |
| 5,979,631 A | 11/1999 | Lundstrom | |
| 5,984,822 A | 11/1999 | Schreier et al. | |
| 6,001,040 A | 12/1999 | Engle | |
| 6,019,694 A | 2/2000 | Forrest et al. | |
| 6,048,286 A | 4/2000 | Perry | |
| 6,056,658 A | 5/2000 | Illmeier | |
| 6,095,939 A | * 8/2000 | Burns et al. | 475/86 |
| 6,119,061 A | 9/2000 | Schenkel et al. | |
| 6,176,800 B1 | * 1/2001 | Shaffer et al. | 192/103 F |
| 6,186,258 B1 | 2/2001 | Deutschel et al. | |
| 6,213,241 B1 | 4/2001 | Kita et al. | |
| 6,216,841 B1 | 4/2001 | Hofer | |
| 6,332,522 B1 | * 12/2001 | Morse et al. | 192/35 |

OTHER PUBLICATIONS

WO 87/06668, Published Nov. 5, 1987, Applicant: Scheidegger, Zwicky, Werner & Co., International Application No. PCT/CH86/00060.

WO 00/12915, Published Mar. 9, 2000, Applicant: McLaren Automotive Group, International Application No. PCT/US99/20054.

WO 94/29618, Published Dec. 22, 1994, Applicant: Vrijburg, International Application No. PCT/NL94/00130, entitled: Differential With Continuous Variable Power Distribution.

* cited by examiner

US 6,681,913 B2

COUPLING DEVICE

TECHNICAL FIELD OF THE INVENTION

This invention relates generally to devices in the automotive industry and, more specifically, to devices for coupling an input shaft and output shaft of an automobile.

BACKGROUND OF THE INVENTION

Front-wheel-drive based vehicles with four-wheel-drive capabilities typically use a twin coupling device to couple a rear drive shaft, which travels from the engine to the rear of the vehicle, to a right half shaft and a left half shaft, which travel to the rear wheels. The twin coupling device typically provides front to rear wheel torque distribution, as well as left to right rear wheel torque distribution. Because of the advantages of four-wheel-drive, however, there is a need in the automotive industry for continuous improvement of the twin coupling device.

DETAILED DESCRIPTION OF THE INVENTION

The following description of three preferred embodiments of the invention is not intended to limit the scope of the invention to these preferred embodiments, but rather to enable any person skilled in the art of automotive coupling devices to make and use the invention.

Figure 1:
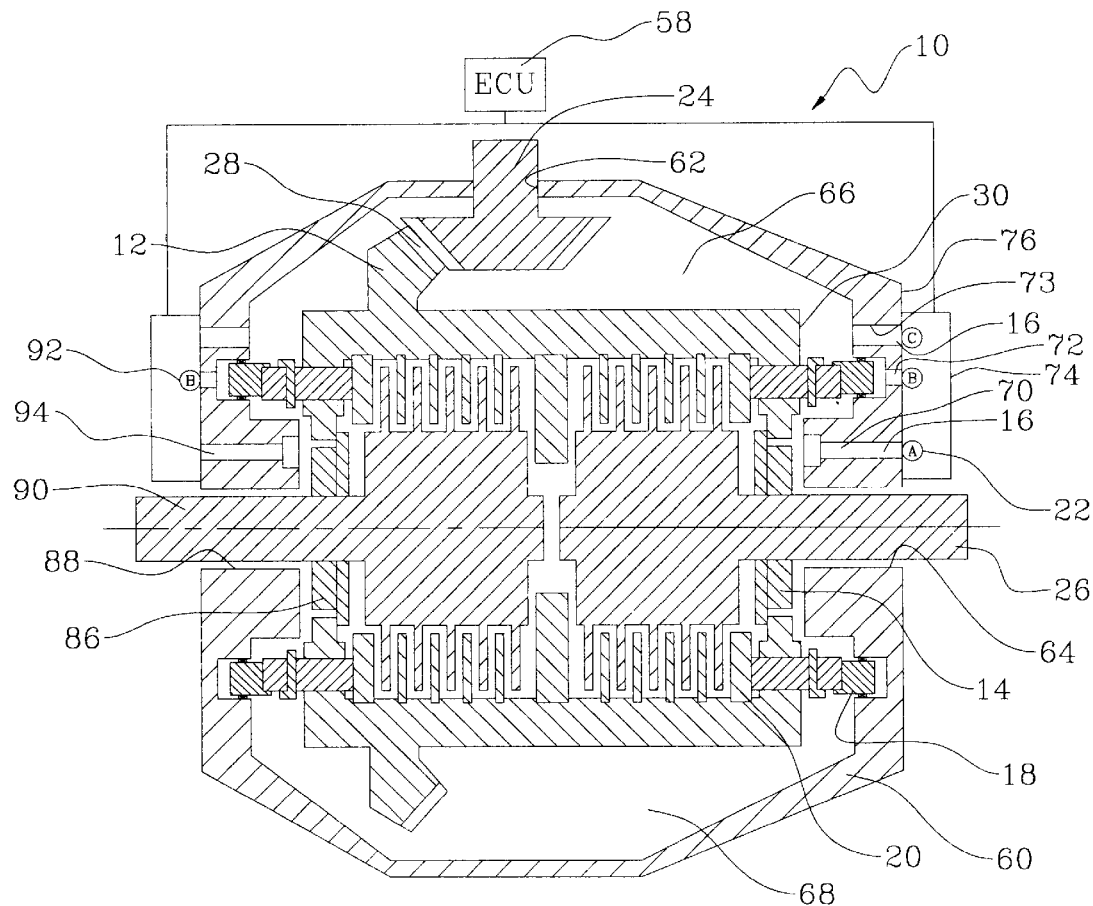
FIG. 1 is a cross-sectional view of the device of the first preferred embodiment.

As shown in FIG. 1, the coupling device 10 of the first preferred embodiment includes a carrier 12, a hydraulic pump 14, a hydraulic conduit 16, a piston 18, a clutch 20, and a control valve 22. The carrier 12 is preferably coupled to an input shaft 24, while the hydraulic pump 14 is preferably coupled to the carrier 12 and an output shaft 26. The hydraulic conduit 16 is preferably coupled to the hydraulic pump 14, the piston 18 is preferably coupled to the hydraulic conduit 16, and the clutch 20 is the preferably coupled to the piston 18. Finally, the control valve 22 is preferably coupled to the hydraulic conduit 16.

Figure 2:
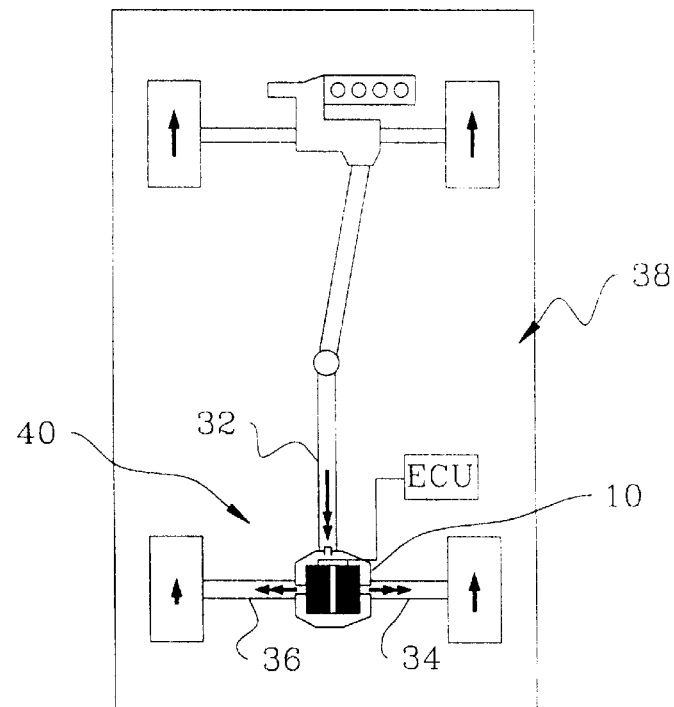
FIG. 2 is a schematic of the device in FIG. 1 arranged within a front-wheel-drive based vehicle with four-wheel-drive capabilities.

As shown in FIG. 2, the coupling device 10 of the first preferred embodiment has been specifically designed for coupling a drive shaft 32, a right half shaft 34, and a left half shaft 36 of a front-wheel-drive based vehicle 38 with four-wheel-drive capabilities. In this arrangement, the coupling device 10 of the first preferred embodiment is known as a twin coupling device 40. The coupling device 10, however, may be used in other suitable arrangements. As an example, the device may be used for coupling a front drive shaft and a rear drive shaft of a front-wheel-drive based vehicle with four-wheel-drive capabilities (known as a coupling device) or the device may be used for coupling a transmission output and a rear drive shaft in a rear-wheel-drive based vehicle with four-wheel-drive capabilities (known as a transfer case).

As shown in FIG. 1, the carrier 12 preferably includes a ring gear 28 and an exterior wall 30. The ring gear 28 of the carrier 12 preferably functions to transfer rotational movement of the input shaft 24 into rotational movement of the carrier 12 about a perpendicular axis. The carrier 12, including the ring gear 28 and the external wall, is preferably made with conventional structural materials, such as steel, and from conventional methods, but may alternatively be made with other suitable materials and from other suitable methods.

Figure 3:
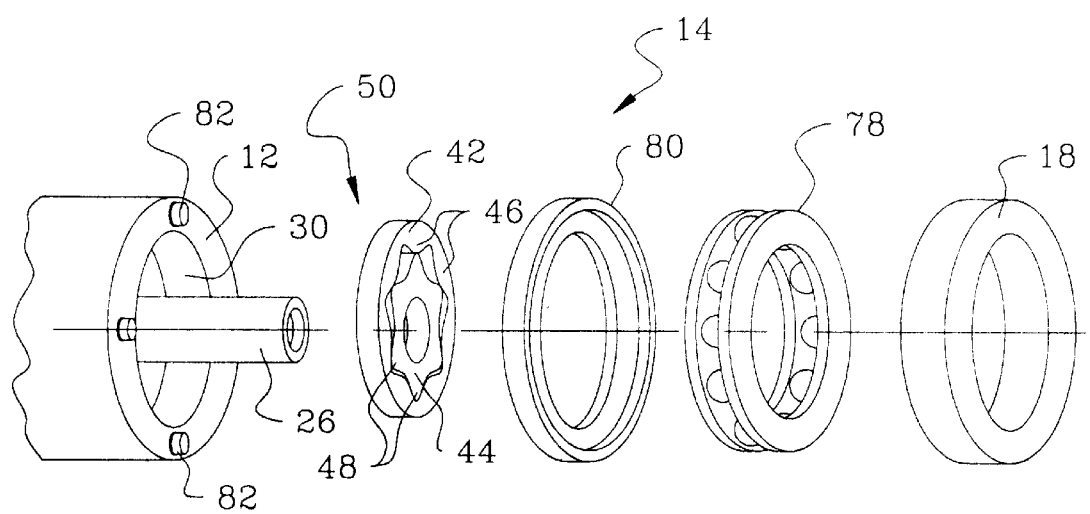
FIG. 3 is an exploded view of the hydraulic pump and the piston of the device in FIG. 1.

As shown in FIG. 3, the hydraulic pump 14 preferably includes an exterior element 42 coupled to the carrier 12 and an interior element 44 coupled to the output shaft 26. The hydraulic pump 14 preferably functions to pump a hydraulic fluid upon relative rotational speed of the carrier 12 and the output shaft 26. The exterior element 42 preferably has inward teeth 46, while the interior element 44 preferably has outward teeth 48. In the preferred embodiment, the exterior element 42 preferably has seven inward teeth 46, while the interior element 44 preferably has six outward teeth 48. In alternative embodiments, however, the exterior element 42 may have more or less than seven inward teeth 46, and the interior element 44 may have more or less than six outward teeth 48, as long as the exterior element 42 has more inward teeth 46 than the interior element 44 has outward teeth 48. The exterior element 42 preferably does not share a rotational axis with the interior element 44. In other words, the exterior element 42 is preferably rotationally offset from the interior element 44. With this tooth arrangement and this rotational offset, the hydraulic pump 14 is commonly known as a gerotor pump 50. The hydraulic pump 14, however, may include other suitable elements that, either in combination with the above elements or as substitution of the above elements, function to pump the hydraulic fluid upon relative rotational speed of the carrier 12 and the output shaft 26. The hydraulic pump 14, including the interior element 44 and the exterior element 42, is preferably made with conventional materials and from conventional methods, but may alternatively be made with other suitable materials and from other suitable methods.

Figure 4:
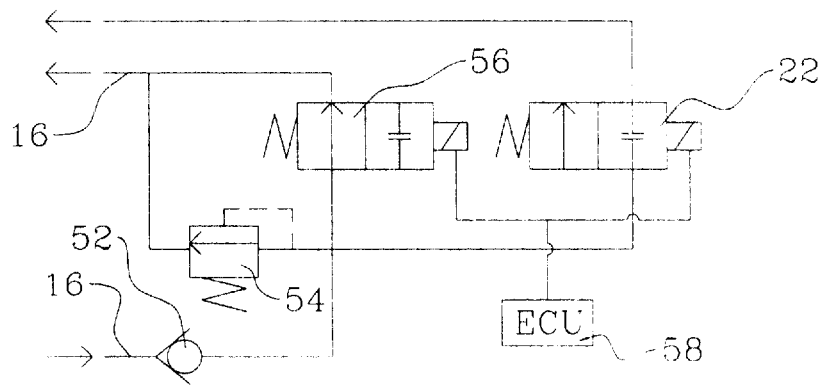
FIG. 4 is a schematic of the valves of the device in FIG. 1.

As shown in FIG. 4, the coupling device of the preferred embodiment also includes a check valve 52, a relief valve 54, and a secondary control valve 56, each preferably coupled to the hydraulic conduit 16. The check valve 52 preferably functions to allow one-way passage of the hydraulic fluid, while the relief valve 54 preferably functions to limit the pressure in the hydraulic conduit 16. Both the control valve 22 and the secondary control valve 56 preferably function to prevent transmittal of the hydraulic fluid through the hydraulic conduit 16. The coupling device of the preferred embodiment may alternatively include other suitable valves or devices that function to suitably condition or alter the hydraulic fluid or pressure in the hydraulic conduit 16. The check valve 52, the relief valve 54, the control valve 22, and the secondary control valve 56 are all preferably made with conventional materials and from conventional methods, but may alternatively be made with other suitable materials and from other suitable methods.

As shown in FIGS. 1 and 4, the coupling device 10 of the preferred embodiment also includes an electric control unit 58 coupled to the control valve 22 and to the secondary control valve 56. The electric control unit 58 preferably functions to control the control valve 22 by pulse width modulation, but may function to control the control valve 22 by other suitable methods. The electric control unit 58 also preferably functions to open or close the secondary control valve 56. By controlling the control valve 22 and the secondary control valve 56, the electric control unit 58 controls the pressure in the hydraulic conduit 16 and selectively prevents transmittal of the hydraulic fluid through the hydraulic conduit 16. The electric control unit 58 is preferably made with conventional materials and from conventional methods, but may alternatively be made with other suitable materials and from other suitable methods.

As shown in FIG. 1, the coupling device 10 of the preferred embodiment also includes a housing 60. The housing 60 preferably defines an input opening 62 that functions to receive the input shaft 24, and an output opening 64 that functions to receive the output shaft 26. The input opening 62 and the output opening 64 may include seals and ball bearings, or other suitable devices, to receive the input shaft 24 and the output shaft 26, respectively. The housing 60 also preferably defines an interior space 66 that functions to receive the carrier 12, the hydraulic pump 14, the piston 18, and the clutch 20, and a reservoir 68 that functions to receive the hydraulic fluid. The housing 60 is preferably made with conventional structural materials, such as steel, and from conventional methods, but may alternatively be made with other suitable materials and from other suitable methods.

The coupling device 10 of the preferred embodiment also includes a valve block 74, which functions to include the check valve 52, the relief valve 54, the control valve 22, and the secondary control valve 56. The valve block 74 is preferably coupled to an exterior surface 76 of the housing 60. In this manner, the valve block 74 may be disconnected and replaced without disassembling the housing 60. In other embodiments, one or more of the valves may be located with the bounds of the housing 60 or in other remote locations. The valve block 74 is preferably made with conventional structural materials, such as certain plastics or steel, and from conventional methods, but may alternatively be made with other suitable materials and from other suitable methods.

In the preferred embodiment, the housing 60 defines a first portion 70, a second portion 72, and a third portion 73 of the hydraulic conduit 16, which function to transmit the hydraulic fluid. The first portion 70 of the hydraulic conduit 16 preferably communicates between the hydraulic pump 14 and the control valve 22, the second portion 72 of the hydraulic conduit 16 preferably communicates between the control valve 22 and the piston 18, and the third portion of the hydraulic conduit 16 preferably communicates between the relief valve 74 and the reservoir 68. In alternative embodiments, other suitable devices may define the first portion 70, the second portion 72, the third portion 73, or all portions of the hydraulic conduit 16.

The piston 18 is preferably coupled to the second portion 72 of the hydraulic conduit 16. The piston 18 is preferably ring-shaped. The piston 18 preferably functions to convert pressure of the hydraulic fluid in the hydraulic conduit 16 into a force against the clutch 20. This conversion, in the preferred embodiment, occurs through the exterior wall 30 of the carrier 12. To accomplish this conversion, the coupling device 10 of the preferred embodiment includes an axial bearing 78, a ring 80, and one or more thrusts 82, as shown in FIG. 3. The thrusts 82 are preferably attached to the exterior wall 30 of the carrier 12 such that they slide along a line parallel to the axis of the carrier 12. The axial bearing 78 and the ring 80 function to allow relative rotational movement of the piston 18 and the thrusts 82. The coupling device, of course, may include other suitable devices to convert pressure of the hydraulic fluid in the hydraulic conduit into a force against the clutch. The piston 18, the axial bearing 78, the ring 80, and the thrusts 82 are all preferably made with conventional materials and from conventional methods, but may alternatively be made with other suitable materials and from other suitable methods.

As shown in FIG. 1, the clutch 20 functions to selectively couple the carrier 12 and the output shaft 26. In the preferred embodiment, the clutch 20 couples the carrier 12 and the output shaft 26 upon sufficient force of the piston 18. In alternative embodiments, the clutch 20 may couple the carrier 12 and the output shaft 26 upon sufficient force or movement of another device or upon a predetermined signal. The clutch 20 is preferably made with conventional materials and from conventional methods, but may alternatively be made with other suitable materials and from other suitable methods.

Figure 5:
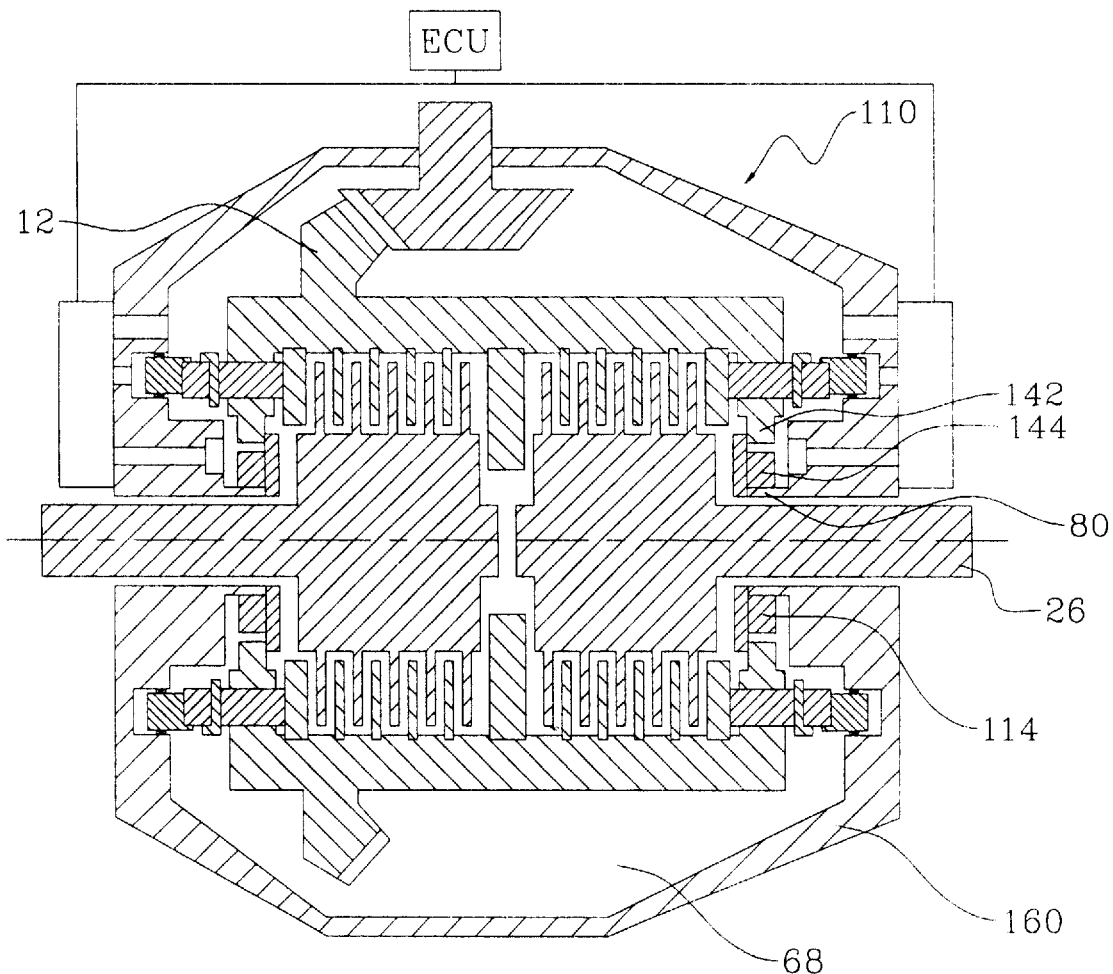
FIG. 5 is a cross-sectional view of the device of the second preferred embodiment.

As shown in FIG. 5, the coupling device 110 of the second preferred embodiment includes a modified housing 160 and a modified hydraulic pump 114. The other elements of the second preferred embodiment are preferably identical to the elements of the first preferred embodiment. The hydraulic pump 114 of the second preferred embodiment is preferably coupled to the carrier 12 and the housing 160, and preferably functions to pump the hydraulic fluid upon relative rotational speed of the carrier 12 and the housing 160. In contrast, the hydraulic pump 14 of the first preferred embodiment is preferably coupled to the carrier 12 and the output shaft 26, and preferably functions to pump the hydraulic fluid upon relative rotational speed of the carrier 12 and the output shaft 26 (as shown in FIG. 1). To realize this modification, the housing 160 includes an inward extension 80; the interior element 144 of the hydraulic pump 114 is preferably coupled to the inward extension 80. The coupling device 110 may alternatively include other suitable devices to couple the hydraulic pump 114 to the carrier 12 and the housing 160.

Figure 6:
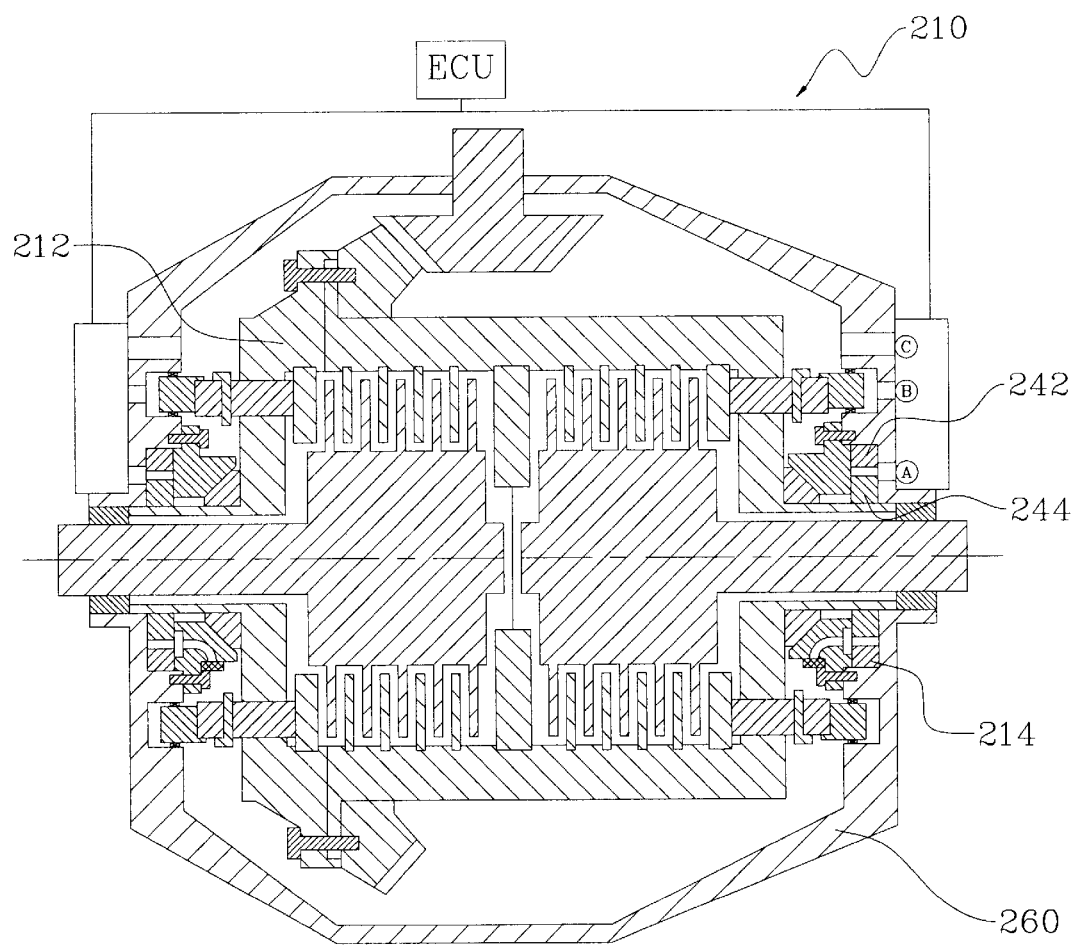
FIG. 6 is a cross-sectional view of the device of the third preferred embodiment.

As shown in FIG. 6, the coupling device 210 of the third preferred embodiment includes a modified carrier 212, a further modified housing 260, and a further modified hydraulic pump 214. The other elements of the third preferred embodiment are preferably identical to the elements of the second preferred embodiment. Like the hydraulic pump 114 of the second preferred embodiment (shown in FIG. 5), the hydraulic pump 214 of the third preferred embodiment is preferably coupled to the carrier 212 and the housing 260, and preferably functions to pump the hydraulic fluid upon relative rotational speed of the carrier 212 and the housing 260. The hydraulic pump 214 includes, however, a modified exterior element 242 coupled to the housing 260 and a modified interior element 244 coupled to the carrier 212. In contrast, the hydraulic pump 114 of the second preferred embodiment includes the exterior element 142 coupled to the carrier 112 and the interior element 144 coupled to the housing 160 (shown in FIG. 5). The realization of this modification allows for the addition of several bearings, which function to reduce friction in the coupling device 210. The coupling device 210 may alternatively include other suitable devices to reduce friction.

As shown in FIGS. 1, 5, and 6, the coupling devices 10, 110, and 210 of the preferred embodiments also include a second set of every element discussed above, except the carrier 12, the housing 60, and electric control unit 58. The carrier 12 is preferably designed to couple the input shaft 24, the hydraulic pump 14, and a second hydraulic pump 86.

The housing 60 is preferably designed with a second output opening 88 that functions to receive a second output shaft 90. The second output opening 88, like the output opening 64, may include seals the ball bearings, or other suitable devices, to receive the second output shaft 90. The electric control unit 58 is preferably separately coupled to the control valve 22 and a second control valve 92. In this manner, the electric control unit 58 may selectively control the pressure in the hydraulic conduit 16 and in a second hydraulic conduit 94, thereby selectively distributing torque to the right and left wheels of the vehicle.

During the preferred operation of the coupling device 10 of the first preferred embodiment, an engine, or other device, rotates the input shaft 24. The ring gear 28 of the carrier 12 transfers the rotational movement of the input shaft 24 into a rotational movement of the carrier 12. If the output shaft 26, which is connected to a wheel of the vehicle, rotates with the same rotational speed of the carrier 12, the hydraulic pump 14 does not pump the hydraulic fluid into the hydraulic conduit 16. If, however, the output shaft 26 starts to rotate with a different rotational speed than the carrier 12 (i.e., there is relative rotational speed of the carrier 12 and output shaft 26), the hydraulic pump 14 pumps hydraulic fluid into the hydraulic conduit 16, and increases the pressure of the hydraulic fluid in the hydraulic conduit 16. The piston 18 converts the pressure of the hydraulic fluid in the hydraulic conduit 16 into a force against the clutch 20, which couples the carrier 12 and the output shaft 26. The electric control unit 58 may increase or decrease the pressure of the hydraulic fluid by controlling the control valve 22 and the secondary control valve 56 and, therefore, increase or decrease the force of the piston 18 onto the clutch 20. In this manner, the electric control unit 58 may selectively control the amount of coupling between the carrier 12 and the output shaft 26.

As any person skilled in the art of automotive coupling devices will recognize from the previous description and from the figures and claims, modifications and changes can be made to the preferred embodiments of the invention without departing from the scope of the invention defined in the following claims.

I claim:

1. A device for coupling an input shaft and an output shaft, comprising:
    a carrier coupled to the input shaft;
    a hydraulic pump coupled to said carrier and the output shaft and adapted to pump a hydraulic fluid upon relative rotational speed of said carrier and the output shaft;
    a hydraulic conduit coupled to said hydraulic pump and adapted to transmit the hydraulic fluid;
    a piston coupled to said hydraulic conduit and adapted to convert pressure of the hydraulic fluid in said hydraulic conduit into a force of said piston;
    a clutch coupled to said piston and adapted to couple said carrier and the output shaft upon sufficient force of said piston;
    a housing defining an input opening adapted to receive the input shaft, defining an output opening adapted to receive the output shaft, defining an interior space adapted to receive said carrier, said hydraulic pump, said piston, and said clutch, and defining a reservoir adapted to receive the hydraulic fluid;
    a control valve coupled to said hydraulic conduit and adapted to selectively prevent transmittal of said hydraulic fluid through said hydraulic conduit, thereby selectively modulating said pressure of said hydraulic fluid, said force of said piston on said clutch, and said amount of coupling between said carrier and said output shaft;
    said housing defining a first portion of said hydraulic conduit from said hydraulic pump to said control valve, and a second portion of said hydraulic conduit from said control valve to said piston; and
    an electric control unit coupled to said control valve and adapted to control said control valve.

2. The device of claim 1 further comprising a valve block coupled to an exterior surface of said housing and adapted to receive said control valve.

3. The device of claim 1 further comprising a relief valve coupled to said hydraulic conduit and adapted to limit the pressure of the hydraulic fluid in said hydraulic conduit.

4. The device of claim 1 wherein said electric control unit is further adapted to control said control valve by pulse width modulation.

5. The device of claim 1 wherein said hydraulic pump includes a gerotor device.

6. The device of claim 1 further comprising:
    a second hydraulic pump coupled to said carrier and a second output shaft and adapted to pump the hydraulic fluid on relative rotational speed of said carrier and the second output shaft;
    a second hydraulic conduit coupled to said second hydraulic pump and adapted to transmit the hydraulic fluid;
    a second piston coupled to said second hydraulic conduit and adapted to convert pressure of the hydraulic fluid in said second hydraulic conduit into a force of said second piston;
    a second clutch coupled to said second piston and adapted to couple said carrier and the second output shaft upon sufficient force of said second piston; and
    a second control valve coupled to said second hydraulic conduit and adapted to selectively prevent transmittal of said hydraulic fluid through said hydraulic conduit, thereby selectively modulating said pressure of said hydraulic fluid, said force of said second piston on said second clutch, and said amount of coupling between said carrier and the second output shaft.

7. The device of claim 1 further comprising a housing defining an input opening adapted to receive the input shaft, defining an output opening adapted to receive the output shaft, defining a second output opening adapted to receive the second output shaft, defining an interior space adapted to receive said carrier, said piston, said second piston, said clutch, and said second clutch, and defining a reservoir adapted to receive the hydraulic fluid.

8. A device for coupling an input shaft and an output shaft, comprising:
    a housing defining an input opening adapted to receive the input shaft, defining an output opening adapted to receive the output shaft, and defining a reservoir adapted to receive a hydraulic fluid;
    a carrier coupled to the input shaft;
    a hydraulic pump coupled to said carrier and the housing and adapted to pump the hydraulic fluid upon relative rotational speed of said carrier and the housing;
    a hydraulic conduit coupled to said hydraulic pump and adapted to transmit the hydraulic fluid;
    a piston coupled to said hydraulic conduit and adapted to convert pressure of the hydraulic fluid in said hydraulic conduit into a force of said piston;

a clutch coupled to said piston and adapted to couple said carrier and the output shaft upon sufficient force of said piston; and a control valve coupled to said hydraulic conduit and adapted to selectively prevent transmittal of the hydraulic fluid through said hydraulic conduit.

9. The device of claim 8 wherein said carrier is further adapted to receive said hydraulic pump.

10. The device of claim 8 wherein said housing defines a first portion of said hydraulic conduit from said hydraulic pump to said control valve, and a second portion of said hydraulic conduit from said control valve to said piston.

11. The device of claim 10 further comprising a valve block coupled to an exterior surface of said housing and adapted to receive said control valve.

12. The device of claim 10 comprising a relief valve coupled to said hydraulic conduit and adapted to limit the pressure of the hydraulic fluid in said hydraulic conduit.

13. The device of claim 10 further comprising an electric control unit coupled to said control valve and adapted to control said control valve.

14. The device of claim 13 wherein said electric control unit is adapted to control said control valve by pulse width modulation.

15. The device of claim 10 wherein said hydraulic pump includes a gerotor device.

16. The device of claim 10 further comprising:

a second hydraulic pump coupled to said carrier and a second output shaft and adapted to pump the hydraulic fluid on relative rotational speed of said carrier and said housing;

a second hydraulic conduit coupled to said second hydraulic pump and adapted to transmit the hydraulic fluid;

a second piston coupled to said second hydraulic conduit and adapted to convert pressure of the hydraulic fluid in said second hydraulic conduit into force of said second piston;

a second clutch coupled to said second piston and adapted to couple said carrier and the second output shaft upon sufficient force of said second piston; and a second control valve coupled to said second hydraulic conduit and adapted to selectively prevent transmittal of the hydraulic fluid through said second hydraulic conduit.

17. A method for coupling an input shaft and an output shaft, comprising:

providing a carrier and coupling the carrier to the input shaft;

providing a housing defining an input opening, an output opening, an interior space, and a reservoir;

providing a hydraulic pump, coupling the hydraulic pump to the carrier and the output shaft, and adapting the hydraulic pump to pump a hydraulic fluid upon relative rotational speed of the carrier and the housing;

providing a hydraulic conduit, coupling the hydraulic conduit to the hydraulic pump, and adapting the hydraulic conduit to transmit the hydraulic fluid;

providing a piston, coupling the piston to the hydraulic conduit, and adapting the piston to convert pressure of the hydraulic fluid in the hydraulic conduit into a force of the piston;

providing a clutch, coupling the clutch to the piston, and adapting the clutch to couple the carrier and the output shaft upon sufficient force of the piston;

providing a control valve, coupling the control valve to the hydraulic conduit, and adapting the control valve to selectively prevent transmittal of the hydraulic fluid through the hydraulic conduit; and an electric control unit, coupling the electric control unit to the control valve, and adapting the electric control unit to control the control valve.

18. The method of claim 4 further comprising adapting the input opening to receive the input shaft, adapting the output opening to receive the output shaft, adapting the interior space to receive the carrier, hydraulic pump, the piston, and the clutch, and adapting the reservoir to receive the hydraulic fluid.

19. The method of claim 18 further comprising providing a valve block, coupling the valve block to an exterior surface of the housing, and adapting the valve block to receive the control valve.

20. The method of claim 17 further comprising providing a relief valve, coupling the relief valve to the hydraulic conduit, and adapting the relief valve to limit the pressure of the hydraulic fluid in the hydraulic conduit.

21. The method of claim 17 further comprising adapting the electric control unit to control the control valve by pulse width modulation.

22. A method for coupling an input shaft and an output shaft, comprising:

providing a housing defining an input opening, and output opening, and a reservoir, adapting the input opening to receive the input shaft, adapting the output opening to receive the output shaft, and adapting the reservoir to receive the hydraulic fluid;

providing a carrier and coupling the carrier to the input shaft;

providing a hydraulic pump, coupling the hydraulic pump to the carrier and the housing, and adapting the hydraulic pump to pump a hydraulic fluid upon relative rotational speed of the carrier and the housing;

providing a hydraulic conduit, coupling the hydraulic conduit to the hydraulic pump, and adapting the hydraulic conduit to transmit the hydraulic fluid;

providing a piston, coupling the piston to the hydraulic conduit, and adapting the piston to convert pressure of the hydraulic fluid in the hydraulic conduit into a force of the piston;

providing a clutch, coupling the clutch to the piston, and adapting the clutch to couple the carrier and the output shaft upon sufficient force of the piston; and providing a control valve, coupling the control valve to the hydraulic conduit, and adapting the control valve to selectively prevent transmittal of the hydraulic fluid through the hydraulic conduit.

23. The method of claim 22 further comprising providing a valve block, coupling the valve block to an exterior surface of the housing, and adapting the valve block to receive the control valve.

24. The method of claim 22 further comprising providing a relief valve, coupling the relief valve to the hydraulic conduit, and adapting the relief valve to limit the pressure of the hydraulic fluid in the hydraulic conduit.

25. The method of claim 22 further comprising providing an electric control unit, coupling the electric control unit to the control valve, and adapting the electric control unit to control the control valve.

26. The method of claim 25 further comprising adapting the electric control unit to control the control valve by pulse width modulation.

* * * * *

UNITED STATES PATENT AND TRADEMARK OFFICE
CERTIFICATE OF CORRECTION

PATENT NO. : 6,681,913 B2
DATED : January 27, 2004
INVENTOR(S) : Hyeongcheol Lee It is certified that error appears in the above-identified patent and that said Letters Patent is hereby corrected as shown below:

Column 7,
Line 16, after "claim 10" insert -- further --.
Line 23, before "adapted" insert -- further --.

Column 8,
Line 8, delete "claim 4" and substitute -- claim 17 -- in its place.

Signed and Sealed this

Sixth Day of July, 2004

JON W. DUDAS
*Acting Director of the United States Patent and Trademark Office*